United States Patent [19]

Salensky

[11] 3,864,426
[45] Feb. 4, 1975

[54] THERMAL SHOCK RESISTANT EPOXY COMPOSITIONS

[75] Inventor: George A. Salensky, Metuchen, N.J.

[73] Assignee: Union Carbide Corporation, New York, N.Y.

[22] Filed: May 23, 1973

[21] Appl. No.: 363,188

[52] U.S. Cl....... 260/837 R, 260/37 EP, 260/42.18, 260/42.28, 260/42.52, 260/831, 260/836, 260/881, 260/884, 260/885, 161/186
[51] Int. Cl............................................. C08g 45/04
[58] Field of Search........................... 260/836, 837

[56] References Cited
UNITED STATES PATENTS

| | | | |
|---|---|---|---|
| 2,861,060 | 11/1958 | Goode | 260/885 |
| 2,926,126 | 2/1960 | Graham | 260/885 |
| 2,940,950 | 6/1960 | Gusman | 260/837 |
| 2,954,358 | 9/1960 | Hurwitz | 260/837 |
| 3,070,564 | 12/1962 | Roeser | 260/836 |
| 3,251,904 | 5/1966 | Souder | 260/876 |
| 3,266,971 | 8/1966 | Miller | 260/836 |
| 3,345,434 | 10/1967 | Griffith | 260/836 |
| 3,506,737 | 4/1970 | Smith | 260/836 |
| 3,542,711 | 11/1970 | Manasia | 260/837 R |
| 3,551,517 | 12/1970 | Dowbenko | 260/836 |

Primary Examiner—Paul Lieberman
Attorney, Agent, or Firm—Charles J. Metz

[57] ABSTRACT

Cured epoxy compositions having improved thermal shock resistance are produced from a glycidyl epoxy resin, an epoxy hardener, and an acrylic polymer mixture.

6 Claims, 1 Drawing Figure

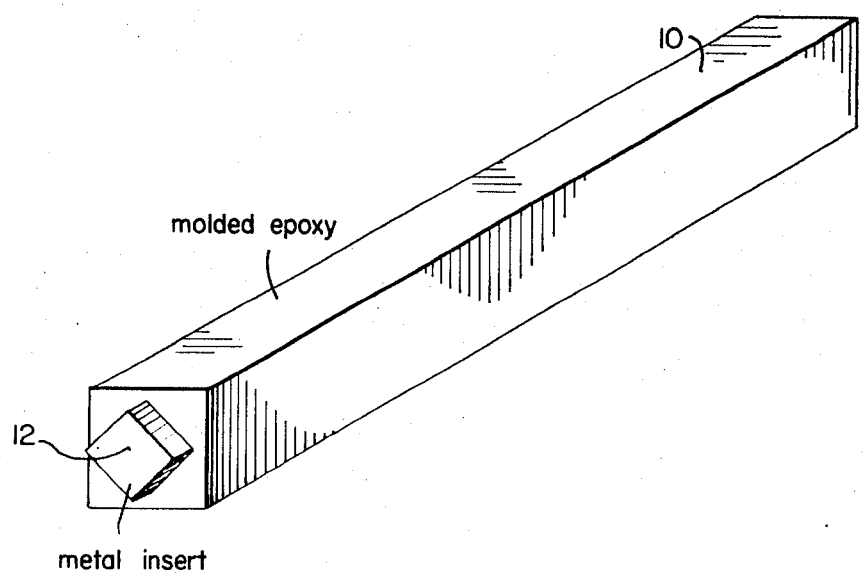

THERMAL SHOCK RESISTANT EPOXY COMPOSITIONS

The invention relates to the art of epoxy resin-based molding compositions. More specifically, the invention relates to the use of certain acrylic polymers as additives in epoxy resin-based molding compositions, to improve the thermal shock resistance of the cured articles produced from such molding compositions.

Thermal shock resistance is resistance to failure, usually as evidenced by crack formation, of an article that is exposed to repeated changes of temperature. With epoxy resin systems, thermal shock is an important factor most particularly when the cured epoxy resin is adhered securely to a metal or other material whose thermal coefficient of expansion is significantly different from that of the cured epoxy. Therefore, thermal shock resistance is required when an epoxy resin is employed as a coating on metal, when an epoxy is used to encapsulate a metal part, or other similar use wherein the cured epoxy is adhered to metal, if repeated temperature changes will be encountered.

In U.S. Pat. No. 3,251,904, there are disclosed certain acrylic polymers comprising a polymeric mixture produced by polymerizing an alkyl methacrylate in the presence of a polymerized alkyl acrylate. This polymeric mixture will be referred to herein as the "acrylic polymer mixture." It is disclosed in this patent that blends of the acrylic polymer mixture with certain thermoplastic polymers, such as polyvinyl chloride, have excellent high impact strength and shock resistance. There is, however, no teaching in this patent that the acrylic polymer mixture can be used with thermoset polymers, nor that if used, any improvement in properties will result.

The present invention is based on the discovery that the acrylic polymer mixture can be employed in epoxy resin-based molding compositions to enhance the thermal shock resistance of the cured articles produced from said compositions. At the same time, certain high temperature properties of the cured articles, such as electrical properties, are not adversely affected by the presence of the thermoplastic acrylic polymer mixture. Accordingly, the present invention provides cured articles comprising the molded reaction products of an epoxy resin molding composition containing said acrylic polymer mixture. In a preferred aspect, the said molded reaction product is adhered to a metal or other material whose thermal coefficient of expansion is significantly different from that of the cured epoxy resin composition.

The Figure is a perspective view of a molded article made from the epoxy resin formulation of the invention.

The principal novelty of this invention resides in the use of the acrylic polymer mixture in an epoxy resin-based molding composition. This polymer mixture comprises an alkyl methacrylate polymer and an alkyl acrylate polymer, wherein the methacrylate polymer was polymerized in the presence of the acrylate polymer. The alkyl acrylate polymer is composed of at least 80 weight percent of polymerized $C_1$–$C_8$ alkyl acrylate, preferably butyl acrylate, any remainder being an olefinically unsaturated monomer tat is copolymerizable therewith. Examples of such comonomers include alkyl methacrylates, acrylic or methacrylic acids and nitriles, vinyl halides especially vinyl chloride, vinylidene halides especially vinylidene chloride, vinyl esters such as vinyl acetate, and styrene.

The alkyl methacrylate portion of the polymer mixture is composed of at least 80 weight percent of polymerized $C_1$ to $C_4$ alkyl methacrylate, preferably methyl methacrylate, any remainder being an olefinically unsaturated monomer that is copolymerizable therewith. Examples of such comonomers include alkyl acrylates, acrylic or methacrylic acids and nitriles, vinyl halide especially vinyl chloride, vinylidene halide especially vinylidene chloride, vinyl esters such as vinyl acetate, and styrene.

The proportions of the two components of the acrylic polymer mixture can vary from 40 to 75 weight percent of the alkyl acrylate, and 60 to 25 weight percent of the alkyl methacrylate, the percentage being based on weight of alkyl acrylate plus alkyl methacrylate.

The acrylic polymer mixture can be produced by first polymerizing the alkyl acrylate by standard procedure in a reaction vessel, and after this polymerization is complete and while maintaining the alkyl acrylate polymer in the vessel, then polymerizing the alkyl methacrylate polymer by standard procedures in the same vessel.

The acrylic polymer mixture is employed in the epoxy resin-based molding composition in an amount effective to enhance the thermal shock resistance of the cured articles produced from said composition. The exace amount employed has not been found to be narrowly critical. Beneficial results will ordinarily be obtained when the acrylic polymer mixture is employed in amounts within the range of from about 2 to about 20 weight percent, based on weight of epoxy resin plus hardener.

The above described acrylic polymer mixture is employed as an additive in an otherwise known class of materials, namely, a solid composition, fusible at elevated temperature and suitable for use in molding, including as essential ingredients (a) a polyglycidyl polyepoxide having an oxirane oxygen equivalency greater than one, and (b) an epoxy curing agent.

Solid, epoxy resin-based molding compositions constitute a known class of materials. They contain as essential ingredients a polyepoxide and an epoxy curing agent, and their essential characteristics are that they are solid at ambient temperatures (even though some of the individual components may be liquid), they are fusible at elevated temperatures (i.e., the temperatures encountered during molding), and they are capable of being cured, preferable within a short time, to a solid, infusible (i.e., thermoset) state at such elevated temperatures. Thus, the expression "suitable for use in molding" is intended to include only those compositions that possess said essential characteristics.

The polyepoxides employed are polyglycidyl compositions having an oxirane oxygen equivalency of greater than one. The polyglycidyl polyepoxides that can be employed include the polyglycidyl ethers of polyhydric phenols such as 2,2-bis(4-hydroxyphenyl)propane, bis(4-hydroxyphenyl)methane, novolak resins, and resorcinol, and the polyglycidyl esters of aromatic aliphatic and cycloaliphatic polycarboxylic acids. Preferred polyglycidyl polyepoxides are the diglycidyl ether of 2,2-bis(4-hydroxyphenyl)propane and the polyglycidyl ethers of novolak resins.

The nature and production of polyglycidyl epoxides are known. For instance, see "Epoxy Resins", by Lee and Neville, McGraw-Hill, 1957, especially Chapter 1 and references cited therein, and U.S. Pat. No. 2,870,170 to Payne et al.

The second essential ingredient employed in epoxy molding compositions is an epoxy curing agent, i.e., a hardener or a hardener plus a promoter or catalyst. Useful classes of hardeners include aromatic polyamines, polyhydric phenols, and polycarboxylic acid anhydrides. Specific hardeners that can be used include diaminotoluenes such as 2,4- and 2,6-diaminotoluene, phenylene diamines, bis(4-aminophenyl)methane ("MDA"), hexahydropthalic anhydride, pyromellitic dianhydride, chlorendic anhydride, emthyl nadic anhydride, and novolak resins.

The aromatic primary amines such as MDA and diaminotoluene are the preferred hardeners.

Useful promoters or catalysts include novolaks (when used with aromatic amine hardeners—the novolak also reacts with the epoxy resin), $BF_3$-amine complexes, alkyl-imidazoles, tertiary amines, and amine-loaded molecular sieves.

The production, nature, and use of epoxy curing agents are known to the art. For example, see the Lee and Neville text cited above, especially Chapters 2 through 5.

In producing molding compositions, the epoxy resin and the curing agent, along with fillers, pigments, lubricants, and other materials that are employed, are mixed together or formulated in such a way that a solid composition that can be pulverized to a fine powder is produced. The techniques for doing this are known in the art. For example, the molding composition can be a single stage molding composition wherein all of the ingredients, which are normally solid, can be mixed simply by pulverizing them together. Since little or no reaction occurs between the epoxy and the hardener during the mixing, single stage epoxy molding compositions have excellent storage stability. A typical formulation for a single stage molding composition is the following:

|  | Weight Percent |
|---|---|
| Polyglycidyl ether of a novolak | 20 |
| Novolak hardener | 10 |
| Mold release agent | 1 |
| Coated molecular sieve catalyst | 2 |
| Silica filler | 27 |

Another type of single stage epoxy resin molding composition is that which is disclosed in U.S. Pat. No. 3,493,630, of which a typical formulation is the following:

|  | Weight Percent |
|---|---|
| Polyglycidyl ether of a novolak | 35 |
| Novolak hardener | 14.3 |
| Alkylimidazole catalyst | 0.04 |
| Silica filler | 49.7 |
| Lubricant | 0.6 |

Another type of epoxy containing molding composition is known as a "B-stage composition". A general procedure for producing a B-stage epoxy resin compound is the following:

A liquid epoxy resin is charged to a kneader type mixer. Filler (which is usually silica), mold lubricant, colorant, and other additives, and the hardener are then added and thoroughly mixed. The resulting mixture is then poured into shallow trays and is permitted to advance until it becomes a grindable solid. At about 25°C., this will take from about 16 to about 24 hours; at 50°C., it will take about 6 hours.

When the mixture has been ground, it is allowed to age further until the desired spiral flow of about 25–35 inches at 1000 p.s.i. and about 300°F. is obtained. (Spiral Flow is obtained by Test Procedure 1-66, Revision A, of the Epoxy Molding Materials Institute.) When the desired spiral flow range is obtained, the material is ready for use, although it can be stored for a brief period of time (e.g., up to about 1 week at room temperature). If longer periods of storage are desired, the material must be kept under refrigeration at, for exampe, 0°C. or below.

Representative types of B-stage epoxy molding compositions are disclosed in U.S. Pat. Nos. 2,773,048 and 3,631,125.

Two representative specific B-stage epoxy resin molding compositions include the following:

| Component | Parts By Weight A | B |
|---|---|---|
| Diglycidyl ether of Bisphenol A | 183 | 183 |
| Novolak | 9.5 | 9.5 |
| Bis(4-aminophenyl)methane | — | 50 |
| m-Toluenediamine (pulverized with 1 per cent anti-sintering agent) | 29.3 | — |
| Silica Flour | 599 | 654 |
| Lubricant | 8.2 | 9 |

As a general rule, the molding conditions for epoxy resin molding compositions (both single stage and B-stage) are a temperature within the range of from about 270° to about 350°F., a pressure from about 400 to about 2500 p.s.i., for periods of less than one minute (for small pieces) to about 5 to 7 minutes.

The molding compositions of the invention can also include other known materials such as fillers, colorants, fibers, lubricants, and others that are customarily employed in molding compositins. Examples of such materials include silica flour, which can be microcrystalline-,macrocrtstalline, or amorphorus, flint powder, ground glass, glass beads, quartz, glass microballons, glass fiber, diatomaceous silica clay, kaolin, talc, mica, asbestos, titania, zirconium silicate, beryl, silicon carbide, rock flour, slate flour, silica containing hydrated alumina, montan wax, and zinc stearate. The filler, pigment, fiber, lubricant, and the like, normally constitute from about 50 to about 80 weight percent of the molding composition. The acrylic polymer mixture can be added to the epoxy molding composition simply by mixing along with the fillers and other additives. Alternatively, the acrylic polymer mixture can be dissolved in the epoxy resin (when a liquid epoxy is employed) prior to mixing with the other components of the molding composition.

The examples which follow illustrate the invention. All parts and percentages are by weight, unless otherwise indicated.

EXAMPLES 1–5

Molded specimens were produced by the B-stage technique from the following five formulations:

TABLE I

| Component | EXAMPLE NO. (Parts By Weight) | | | | |
|---|---|---|---|---|---|
| | 1 | 2 | 3 | 4 | 5 |
| Diglycidyl ether of 2,2-bis(4-hydroxyphenyl)-propane having an epoxy assay of 183 grams/gram mole epoxy | 645 | 645 | 645 | 645 | 645 |
| Novolak, having an average of 5 to 6 phenol groups per molecule | 33.2 | 33.2 | 33.2 | 33.2 | 33.2 |
| m-toluenediamine | 102.6 | 102.6 | 102.6 | 102.6 | 102.6 |
| Silica filler (macrocrystalline, 325 mesh) | 1556 | 1656 | 1656 | 1478 | 1400 |
| Fiberglass, ¼ inch average length | — | — | — | 78 | 156 |
| Montan wax lubricant (Bohemian Grade) | 19.1 | 19.1 | 19.1 | 19.1 | 19.1 |
| Acrylic Graft Copolymer (Rohm and Haas acryloid KM-323B - a graft copolymer formed by polymerizing methyl methacrylate in contact with a polymer of n-butyl acrylate) | — | 110 | 55 | — | — |

The heat distortion temperatures were measured (by the test procedure ASTM D-648-56) on ½ inch × ½ inch × 5 inch bars molded from the formulations of Examples 1–3. The molding conditions were 5 minutes at 1000 p.s.i. and 300°F. The freshly molded bars were allowed to cool slowly overnight to room temperature. The heat distortion temperatures of these molded specimens were:

| Example | Heat Distortion Temp. |
|---|---|
| 1 | 98°C. |
| 2 | 96°C. |
| 3 | 96°C. |

The insubstantial lowering of the heat distortion temperature, despite the presence of the thermoplastic acrylic polymer in Examples 2 and 3, is surprizing.

The thermal shock resistance of molded specimens prepared from all five of the above formulations was measured by an accelerated thermal shock test in accordance with the following procedure:

A sand-blasted ¼-inch square aluminum bar 5 inches long was centrally positioned on a longitudinal edge in the mold used to make the above-described heat distortion specimens. This bar was then encapsulated in the epoxy resin-based molding formulation by transfer molding. The molding conditions were 1000 p.s.i. and 300°F. for 4-½ minutes. The molded bars were allowed to cool overnight to room temperature, and were then subjected to the thermal shock test. The Figure shows such molded bars wherein a metal insert 12 encapsulated in a molded epoxy formulation 10. The bars were produced with the metal insert positioned as shown in the Figure in order to provide high stress areas in the molded specimens. The areas of high stress (with respect to thermal shock) occurred along the longitudinal edges of the metal inserts.

Five molded specimens from each formulation were first placed in a forced air circulating oven for 25 minutes at the temperature indicated in Table II below, and were then removed and were immersed, while still hot, in a dry ice-methanol bath for 10 minutes at the temperature indicated in Table II. The specimens were then removed from the dry ice-methanol bath and placed in the oven again to begin another cycle. The cycle at which three out of five specimens failed, as evidenced by crack formation, was taken as the thermal shock resistance. The cycle schedule used was the following:

TABLE II

| Cycle No. | Oven Temperature °C. | Dry Ice-Methanol Bath Temperature, °C. |
|---|---|---|
| 1 | +130 | 0 |
| 2 | 130 | −10 |
| 3 | 130 | −20 |
| 4 | 130 | −30 |
| 5 | 130 | −40 |
| 6 | 130 | −50 |
| 7 | 130 | −60 |
| 8 | 130 | −70 |
| 9 | 140 | −70 |
| 10 | 150 | −70 |
| 11 | 160 | −70 |
| 12 | 170 | −70 |
| 13 | 170 | −70 |
| 14 | 170 | −70 |
| 15 | 170 | −70 |
| 16 | 170 | −70 |
| 17 | 170 | −70 |
| 18 | 170 | −70 |
| 19 | 170 | −70 |
| 20 | 170 | −70 |

(In cases where the test ran longer than one working day, it was interrupted and continued on the next working day. In such cases, the test specimens were stored at room temperature until the test was resumed.)

The thermal shock resistance of the molded specimens were as follows:

TABLE III

| Example No. | Thermal Shock Resistance, Number of Cycles |
|---|---|
| 1 | 8 |
| 2 | >20 |
| 3 | >20 |
| 4 | 18 |
| 5 | 19 |

Since a principal utility for epoxy resin-based molding compositions is as electrically insulation where elevated temperatures will be encountered, various electrical properties were determined on specimens that were transfer molded from the formulations of Example 1–3. The specimens were disks 4 inches in diameter by ⅛-inch thick. The molding conditions were 5 minutes at 300°F. and 1000 p.s.i. The results of these tests are shown below in Table IV:

TABLE IV

ELEVATED TEMPERATURE ELECTRICAL PROPERTIES

| Electrical Properties | | Example No. | | |
|---|---|---|---|---|
| | | 1 | 2 | 3 |
| Dielectric Constant at | 23°C.-60 Hz | 4.27 | 4.13 | 4.23 |
| | 100°C. | 4.69 | 4.45 | 4.61 |
| | 125°C. | 4.90 | 4.53 | 4.72 |
| | 150°C. | 5.02 | 4.53 | 4.75 |
| | 175°C. | 5.38 | 4.79 | 5.00 |
| | 200°C. | 6.59 | 5.15 | 5.44 |
| Dissipation Factor at | 23°C.-60 Hz | 0.027 | 0.026 | 0.027 |
| | 100°C. | 0.047 | 0.052 | 0.049 |
| | 125°C. | 0.070 | 0.080 | 0.072 |
| | 150°C. | 0.108 | 0.096 | 0.089 |
| | 175°C. | 0.304 | 0.167 | 0.174 |
| | 200°C. | 0.852 | 0.394 | 0.463 |
| Dielectric Constant at | 23°C.-1 KHz | 4.09 | 3.93 | 4.06 |
| | 100°C. | 4.49 | 4.31 | 4.48 |
| | 125°C. | 4.37 | 4.12 | 4.26 |
| | 150°C. | 4.53 | 4.20 | 4.37 |
| | 175°C. | 4.61 | 4.25 | 4.44 |
| | 200°C. | 4.71 | 4.36 | 4.56 |
| Dissipation Factor at | 23°C.-1 KHz | 0.019 | 0.020 | 0.019 |
| | 100°C. | 0.036 | 0.034 | 0.035 |
| | 125°C. | 0.036 | 0.030 | 0.029 |
| | 150°C. | 0.047 | 0.033 | 0.035 |
| | 175°C. | 0.064 | 0.040 | 0.042 |
| | 200°C. | 0.127 | 0.064 | 0.073 |
| Volume Resistivity at | 23°C.-Megohm-cm | $0.36 \times 10^8$ | $0.36 \times 10^8$ | $0.36 \times 10^8$ |
| | 100°C. | $0.19 \times 10^8$ | $0.25 \times 10^8$ | $0.24 \times 10^8$ |
| | 125°C. | $0.75 \times 10^7$ | $0.14 \times 10^8$ | $0.11 \times 10^8$ |
| | 150°C. | $0.22 \times 10^7$ | $0.38 \times 10^7$ | $0.26 \times 10^7$ |
| | 175°C. | $0.11 \times 10^6$ | $0.18 \times 10^6$ | |
| | 200°C. | $0.11 \times 10^5$ | $0.25 \times 10^5$ | $0.20 \times 10^5$ |

The addition of the acrylic polymer mixture does not degrade the elevated temperature electrical properties of the epoxy system. The modified compositions, Example Nos. 2 and 3, are superior to the control, Example No. 1, in that their elevated temperature dielectric constants and dissipation factors, particularly at 150°C., are lower when measured at either 60 Hz or 1 KHz. The lower values are in proportion to the amount of acrylic modifier used.

Improvements are also seen in volume resistivity at 125°C. In this case,, the acrylic modified compositions are higher in volume resistivity or electrical insulation strength. Volume resistivity is a measure of D.C. electrical insulation strength, whereas dielectric constant and dissipation factor are measures of A.C. electrical insulation strength.

Unlike most impact modifiers, which degrade elevated temperature electrical properties, the acrylic modifier produces compounds which are at least equivalent, and in some cases are superior, in this respect.

What is claimed is:

1. A cured article having good thermal shock resistance, said article comprising the molded reaction product of a solid composition, fusible at elevated temperatures and suitable for use in molding, containing (a) a polyglycidyl ether of a polyhydric phenol, having an oxirane oxygen equivalency greater than one, (b) an epoxy curing agent and (c) an acrylic graft copolymer comprising an alkyl methacrylate polymer and an alkyl acrylate polymer, said alkyl methacrylates polymer having been polymerized in intimate contact with said alkyl acrylate polymer, wherein the acrylic graft copolymer contains from 40 to 75 weight percent of alkyl acrylate and from 60 to 25 weight percent of alkyl methacrylate, the percentage being based on weight of said acrylic graft copolymer.

2. The cured article of claim 1 wherein said polyhydric phenol is 2,2-bis(4-hydroxyphenyl)propane.

3. The cured article of claim 1 wherein said epoxy curing agent is an aromatic amine.

4. The cured article of claim 1 wherein said molded reaction product is adhered to a metal article.

5. The cured article of claim 2 wherein said molded reaction product is adhered to a metal article.

6. The cured article of claim 3 wherein said molded reaction product is adhered to a metal article.

* * * * *